(12) United States Patent
Wang et al.

(10) Patent No.: US 8,805,767 B1
(45) Date of Patent: Aug. 12, 2014

(54) MACHINE LEARNING MEMORY MANAGEMENT AND DISTRIBUTED RULE EVALUATION

(75) Inventors: Jue Wang, Redmond, WA (US); Madhu M. Kurup, Bellevue, WA (US); Jared S. Lundell, Mercer Island, WA (US); Thomas Robert Park, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 254 days.

(21) Appl. No.: 13/479,024

(22) Filed: May 23, 2012

(51) Int. Cl.
*G06F 17/00* (2006.01)
*G06N 5/02* (2006.01)

(52) U.S. Cl.
USPC .......................................................... 706/47

(58) Field of Classification Search
CPC combination set(s) only.
See application file for complete search history.

(56) References Cited

U.S. PATENT DOCUMENTS 8,527,475 B1 * 9/2013 Rammohan et al. .......... 707/692

* cited by examiner

*Primary Examiner* — Michael B Holmes
(74) *Attorney, Agent, or Firm* — Knobbe, Martens, Olson & Bear, LLP

(57) ABSTRACT

Aspects of the present disclosure relate to management of evaluated rule data sets. Specifically, a unreduced evaluated rule data set may contain a number of items to be compared or analyzed according to a number of rules, and may also contain the results of such analysis. An illustrative reduced evaluated data set can include the results of evaluated rules. When utilized in conjunction with an item data set and a rule data set, the information contained within the unreduced evaluated rule data set may be maintained. The reduce memory requirements of the reduced evaluated rule data set may facilitate storage of the reduced evaluated rule data set in faster to access memory, or may facilitate distributed computation of the reduced evaluated rule data set.

25 Claims, 7 Drawing Sheets

| ITEM ID A | ITEM ID B | SOURCE ATTRIBUTES | TARGET ATTRIBUTES | THRESHOLD | RESULT |
|---|---|---|---|---|---|
| 1 | 2 | SHOE_SIZE AND SHOE_WIDTH | SIZE_ATTRIBUTES_1 | >80% | 1 |
| 1 | 2 | SHOE_SIZE AND SHOE_WIDTH | SIZE_ATTRIBUTES_1 | >90% | 1 |
| 1 | 2 | SHOE_SIZE AND SHOE_WIDTH | SIZE_ATTRIBUTES_1 | >95% | 0 |
| 1 | 3 | SHOE_SIZE AND SHOE_WIDTH | SIZE_ATTRIBUTES_1 | >80% | 0 |
| 1 | 3 | SHOE_SIZE AND SHOE_WIDTH | SIZE_ATTRIBUTES_1 | >90% | 0 |
| 2 | 3 | SHOE_SIZE AND SHOE_WIDTH | SIZE_ATTRIBUTES_1 | >95% | 0 |
| 2 | 3 | SHOE_SIZE AND SHOE_WIDTH | SIZE_ATTRIBUTES_1 | >80% | 1 |
| 2 | 3 | SHOE_SIZE AND SHOE_WIDTH | SIZE_ATTRIBUTES_1 | >90% | 1 |
| 2 | 3 | SHOE_SIZE AND SHOE_WIDTH | SIZE_ATTRIBUTES_1 | >95% | 1 |

*Fig.2.*

MACHINE LEARNING MEMORY MANAGEMENT AND DISTRIBUTED RULE EVALUATION

BACKGROUND

Generally described, computing devices utilize a communication network, or a series of communication networks, to exchange data. Companies and organizations operate computer networks that interconnect a number of computing devices to support operations or provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing devices to provide computing resources to users of the data center. The data centers may be private data centers operated on behalf of an organization or public data centers operated on behalf, or for the benefit of, the general public.

Data centers or other computing devices may be utilized to process data intensive applications, such as machine learning applications. In one aspect, machine learning applications may generally describe applications that enable computing devices to define or modify behaviors based on empirical data. For example, a machine learning algorithm may be utilized to determine what rules best facilitate a medical diagnosis based on a number of tests, or to determine the likelihood that a credit card transaction is fraudulent. Generally, machine learning applications utilize a set of data, sometimes referred to as training data, to predict or evolve related decision algorithms. Training data may correspond to a set data points evaluated based on a set of rules. For example, training data may comprise a number of credit card transactions, a number of rules determining whether elements of a transaction are indicative of fraud, and the result of each credit card transaction when evaluated according to the rule. A machine learning application may utilize training data, in addition to other data, such as historical records of fraudulent transactions, to determine an algorithm for predicting fraudulent transactions. For example, a machine learning application may select an algorithm that incorporates a number of the rules within the training data, while not incorporating other rules. In some applications or environments, training data may require large amounts of memory to store, due to the volume of data points or rules included.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 2 is an illustrative graphical visualization or representation of an unreduced evaluated rule data set including item identifiers, rules, and results;

DETAILED DESCRIPTION

Figure 1:
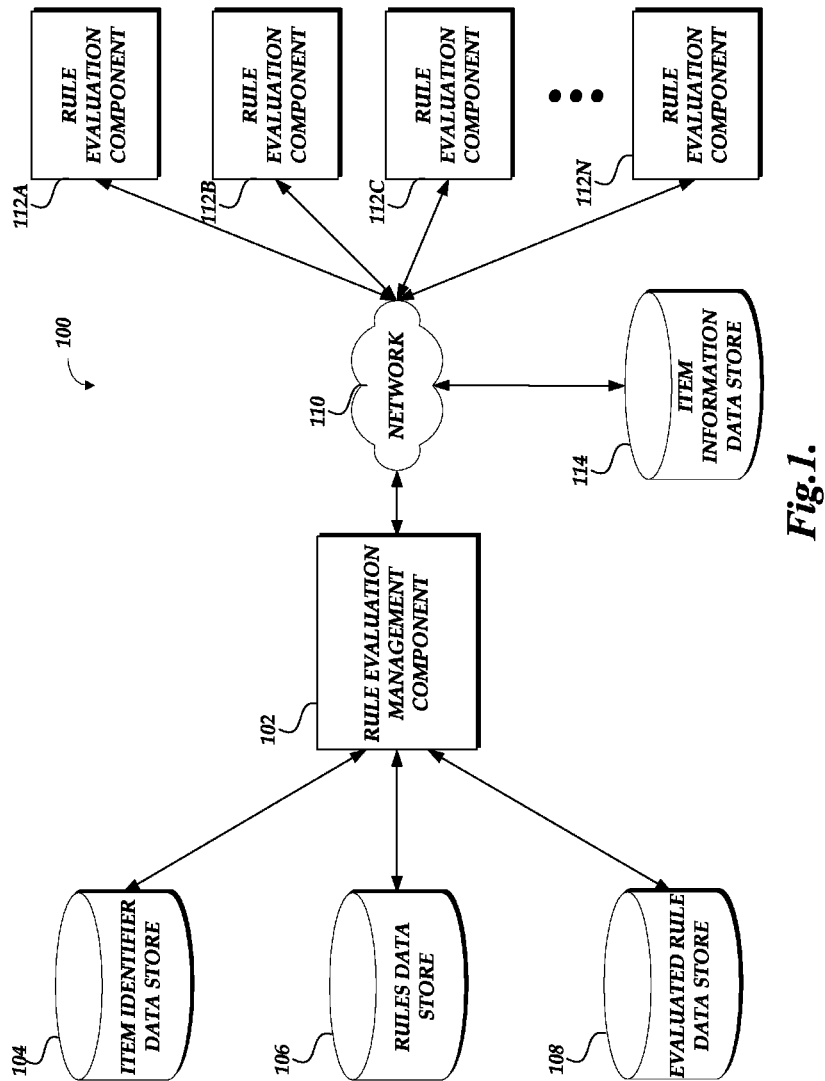
FIG. 1 is a block diagram depicting an illustrative distributed rule evaluation environment including a rule evaluation management component and a number of rule evaluation components that may distributively generate an evaluated rule data set based on item information and a number of rules.

Generally described, aspects of the present disclosure relate to the management and computation of data for use in machine learning applications. Specifically, aspects of the present disclosure relate to the creation of reduced evaluated rule data sets requiring a reduced amount of memory to represent or store when compared to an unreduced data set. Generally, an unreduced data set may refer to a data set containing: (1) a number of data items or attributes to be evaluated, (2) a number of rules by which to evaluate such data items, and (3) the results of each evaluation. In accordance with aspects of the present disclosure, three distinct data sets may be created, which, when utilized in conjunction, may represent the entirety of the information contained within the unreduced evaluated rule data set. Specifically, first and second data sets may be created comprising (1) a number of data items or attributes to be evaluated; and (2) a number of rules by which to evaluate such data items, respectively. A third data set (e.g., a reduced evaluated rule data set) may then be created comprising the results of the evaluation of each data item or attribute based on each rule. Further, aspects of the present disclosure relate to the distributed computation of such reduced evaluated rule data sets.

Reduced evaluated rule data sets may require significantly less memory to represent than the unreduced evaluated rule data set discussed above. For example, a typical evaluated rule data set may require multiple gigabytes of memory in order to store. This may make storage in faster memory (e.g., random access memory, or RAM) impossible or undesirable. Further, large evaluated rule data sets may be difficult to compute distributively, due to bandwidth requirements for transporting all or a portion of the data set. The use of reduced evaluated rule data sets may facilitate faster evaluation of the data sets, and faster processing of these data sets in machine learning applications. Illustratively, a reduced evaluated data set may, in some instances, be storable completely in faster access memory (RAM) of a computing device, or may be easily transportable over a network, even with limited bandwidth. Further, use of a reduced evaluated rule data set may avoid some drawbacks of other memory reduction techniques, such as standard compression. For example, use of a reduced evaluated rule data set may enable the addition of new data items into the reduced evaluated rule data set without extracting, recomputing, or recompressing the data set.

As an illustrative example, a machine learning algorithm may be configured, at least in part, to determine whether two items for sale via an e-commerce site are in fact the same item. Illustratively, two vendors may offer items for sale via the e-commerce site that are considered to be the same, or at least sufficiently similar, but that may be associated with slightly different descriptive terms. In the event that the e-commerce site provider determines that the items are in fact the same or sufficiently similar, the items may be presented in single, unified page regarding the item or in order to facilitate proper searching of items.

In one embodiment, a machine learning task may utilize a number of rules to compare data describing each item. The result of each rule evaluation for each item may be stored in an evaluated rule data set, along with evaluated rules for a number of additional items. This data set may then be utilized as training data across a number of machine learning applications. However, if the number of rules and items within the evaluated data set is large, the data set itself may be quite large. For example, a comparison of all combinations of 5 items against 3 rules would result in 30 possible rule-item-result sets (10 possible combinations*3 rules). Generally, the number of rule-item-result sets may be determined by multiplying the number of rules against the number of possible item combinations. Rules may generally refer to any set of parameters or components used to analyze an item, an item combination, or attributes of an item or items, and determine a result. Rules may have a number of components, such as which attributes of an item are to be evaluated, the method of evaluation, the threshold for a positive result, etc. In some instances, a machine learning application may function by utilizing every combination or permutation of each rule component (e.g., the number of methods of evaluation, the number of combinations of data, the number of thresholds, etc.). In many machine learning applications, the total number of resultant rules may number into the thousands or higher. Moreover, where a large number of items exist (e.g., on a large e-commerce site), the number of item combinations may also rank into the thousands or higher. As such, the total number of rule-item-result sets may grow large quickly.

Though referred to generally herein as rules, items or item combinations may assessed according to any criteria set, which may alternatively be referred to as conditions. As described above, rules or conditions may encompass any number of components setting forth criteria for evaluating an item or item combination.

A machine learning application may access each rule-item-result set in order to make use of the data. As such, the size of data required for each machine learning application may be quite large. For example, given 20,000 possible item combinations, and 100,000 possible rules, 2,000,000,000 possible rule-item-result sets exist. Assuming each result may be represented by a single memory bit (e.g., true or false), each item combination takes a larger amount of memory to store (e.g., 2 bytes), and each rule takes a still larger amount of memory to store (e.g., 4 bytes), the resultant evaluated rule data set would require at least 12.25 gigabytes of storage to represent (6 bytes+1 bit per rule-item-result set, 2 billion possible). Given that the encoding of a data set may require additional overhead, the resultant evaluated rule data set may be even larger. For example, the language (e.g., Java, C, etc.) in which the evaluated rule data set is stored may impose some amount of overhead on the data type used to store each rule, item, or result. As such, the evaluated rule data set is likely to be larger than the ideal calculation.

Such large sizes of evaluated rule data sets may present challenges to implementing machine learning applications. For example, the processing time may increase in order to facilitate data retrieval and storage (e.g., if the evaluated rule data set is stored in a hard disk drive, rather than RAM). As a further example, distributed computation of data sets may be hindered by the large bandwidth requirements of transporting the data. Still further, distributed use of the completed evaluated data set may be similarly limited by bandwidth concerns.

As such, aspects of the present disclosure may be utilized to reduce the total size of an evaluated rule data set. Illustratively, in one embodiment, separate data sets may be utilized to represent item combinations, rules, and results, respectively. Because creation of an evaluated rule data set (as described above) is generally concerned with computation of results, transmission of the item combination and rule data sets may be limited, reducing potential bandwidth concerns. For example, the combination and rule data sets may be required to be transmitted a single time. A reduced evaluated rule data set containing only the results of computation may realize a large reduction in the total memory required to store the data set. Illustratively, in the example data set given above, 2,000,000,000 possible rule-item-result sets exist. If each result may be represented by a single bit, less than 250 megabytes would be required to represent all results of the set (in ideal conditions). Accordingly, a reduced evaluated rule data set (e.g., a results data set) may be transmitted much more quickly than the previous unreduced evaluated rule data set discussed above.

In order to utilize a reduced evaluated rule data, the set of rules and item combinations may also be required to be known. For example, the reduced evaluated rule data set may be represented by a two dimensional array, where the column within the array corresponds to a given rule, and where the row within the array corresponds to a given item combination. Two additional data sets (for rules and item combinations, respectively) may map these column and row positions to actual rules or product identifiers. Continuing the example given above, each of the 100,000 possible rules may require a 3 byte identifier to represent (e.g., assuming there are under ~16 million rules), and 4 bytes to represent the actual rule (as described above). As such, each rule could be mapped to an identifier in a data set of 700 megabytes (100,000 combinations*7 bytes per rule and rule identifier pair). Each of the 20,000 item combinations may require a 2 byte identifier (e.g., if there are under ~65,000 item combinations) and 2 bytes to represent the item combination (as described above). As such, each item combination could be mapped to an identifier in a data set of 80 megabytes (20,000 combinations*4 bytes per combination-identifier pair). Given a 250 MB result data set, a 700 MB rule data set, and a 80 MB item combination data set, the complete evaluated rule data set described above as requiring 12.25 GB of memory storage could be represented in 1.03 GB, or less than 10% of the initial size.

In some embodiments, the rules data set and the item combinations data set may be further reduced in size. For example, hashing functions may enable either the rule data set or the item combination data set to be represented by less than the memory space described above. General hashing functions are well known within the art, and therefore will not be described in more detail herein. Further, in some embodiments, the rules data set and the item combinations data set may not be subject to frequent change. As such, these data sets may only need to be transmitted a single time, further reducing memory consumption.

As described above, the user of reduced evaluated rule data sets may result in benefits due to its smaller memory utilization. For example, in some instances, the entirety of a reduced evaluated rule data set may be storable within RAM or other quick-access memory of a computing device. Further, reduced evaluated rule data sets may be more easily transportable over networks, such as those with limited bandwidth. In some instances, reduced memory required to transmit all or a portion of a reduced evaluated data set may facilitate more efficient distributed computation of the reduced evaluated data set. Such distributed computation may enable more control over selection of computing devices on which to evaluate item and rule combinations. For example, a desired portion of a reduced evaluated rule data set may require calculations difficult for a general purpose processor, but comparatively simple for a graphical processer. As such, distributed computation of a reduced evaluated rule data set may enable selection of computing systems to evaluated item and rule combinations according to the capabilities of those computing systems, as will be described in more detail below. Moreover, as described above, use of a reduced evaluated rule data set may avoid some drawbacks of other memory-reduction techniques, such as standard compression. For example, use of a reduced evaluated rule data set may enable the addition of new data items into the reduced evaluated rule data set without extracting, recomputing, or recompressing the data set.

In some embodiments, the use of a reduced evaluated rule data set which is separate from a rule identifier data set and an item combination data set may enable sensitive data to be anonymized without modification of the reduced evaluated rule data. For example, the item combination identifiers and rule identifiers within the reduced evaluated rule data may be selected such that they do not reveal any information regarding the corresponding item combination or rule, respectively. As such, a complete reduced evaluated rule data set may be distributed without disclosing any sensitive information contained within the item combination or rules. Further, the item combination identifier data set or the rule data set may be anonymized (e.g., by modifying the items corresponding to each item combination, or rules corresponding to each rule combination) without modification of the reduced evaluated rule data. Distribution of reduced evaluated rule data in conjunction with anonymized identifier data sets may enable a reduced evaluated rule data set to be more widely used than would otherwise be possible. For example, it may allow distribution of the reduced evaluated rule data set to an outside agency or to the public (e.g., for purposes of learning, competition, disclosure, etc.).

Illustratively, a machine learning application may be concerned with identifying an algorithm to determine whether profiles on social networking systems correspond to the same person. As such, a reduced evaluated rule data set may contain item combinations corresponding to a number of social networking profiles (e.g., names, addresses, etc.). By anonymizing the data within an item combination identifier data set (e.g., by altering names, etc.), the reduced evaluated rule data set may be distributed without disclosing such information. Further, in some instances, specific rules or rule components may contain sensitive information (e.g., trade secrets corresponding to algorithms, etc.). However, by obfuscating or anonymizing such information, a reduced evaluated rule data set may be disclosed without risking disclosure of the sensitive information.

With reference now to FIG. 1, a block diagram depicting an illustrative rule evaluation environment 100 for use in distributively generating an evaluated rule data set, such as a reduced evaluated rule data set will be described. As illustrated in FIG. 1, the illustrative rule evaluation environment 100 includes a rule evaluation management component 102 in communication with an item identifier data store 104; a rule set data store 106; and an evaluated rule data store 108. The rule evaluation environment 100 further includes an item information data store 110 and a number of rule evaluation components 112A-N in communication with the rule evaluation management component 102 via the network 110. The network 110, in addition to any of the networks described herein, may be any wired network, wireless network or combination thereof. In addition, any of the networks described herein may be a personal area network, local area network, wide area network, cable network, satellite network, cellular telephone network, etc., or any combination thereof.

The rule evaluation management component 102 may be operable to create an item combination data set, a rule data set, and an initial (e.g., empty) reduced evaluated rule data set. For example, the item combination data set may be created on information regarding items for which comparisons are desired (e.g., combinations of items available for purchase on an e-commerce website) that are stored within the item identifier data store 104. As described above, combinations of items may be utilized, for example, in order to determine whether a pair of items constitutes the same or substantially the same item, or for use in creation of training data directed to machine learning of the same. As such, the item identifier data store 104 may store information related to each item that would allow a computing component to access further information about the item. Illustratively, the item identifier data store 104 may store a list of item identifiers that are mapped to further item information within the item information data store 114 (e.g., a data store of general information regarding an item, such as size, color, price, etc.). As will be described in more detail below, information within the item information data store 114 may be utilized in order to evaluate rules (e.g., whether two identified items satisfy a given rule) for creation of an evaluated rule data set.

The rule evaluation management component 102 may utilize the information stored within the item identifier data store in order to create the item combination data set. Such a data set may reflect each possible combination of items, and assign a unique identifier to each item combination. This unique identifier may be utilized in creation of a reduced evaluated rule data set (e.g., a results data set). One example of an item combination data set will be described in more detail with respect to FIG. 3A, below.

Further, the rule data set may be created on information regarding rules for evaluating a combination of items. For example, each rule may establish an algorithm and parameters on which to evaluate one item against another. Illustratively, a rule may specify that the title of two items should be compared, and if they are at least 90% similar (according to a given comparison algorithm), the rule is satisfied (e.g., the two items may be consider "the same" for the purposes of the rule). Though basic rule parameters are described herein, a rule may encompass any algorithm by which to evaluate one or more items. For example, a rule may be asymmetric (e.g., item 1 may satisfy the rule with respect to item 2, but not the reverse) or symmetrical (e.g., only satisfied if the order of items when evaluating a rule is reliable). In another aspect, a rule may include or specify, by way of non-limiting example, algorithms for use in processing information about items (e.g., an algorithm to directly compare, to compare after removing whitespace, etc.); threshold values for satisfying specified rules (e.g., 70%, 80%, 90%, etc.) based on the output by a given algorithm; what attributes of a given item to compare to another (e.g., title fields, descriptions, sizes, weights), and whether blank attributes are acceptable (e.g., whether a blank attribute may ever satisfy a rule).

The rule evaluation management component 102 may utilize the information stored within the rules data store in order to create the rules data set. Such a data set may assign a unique identifier to each rule. In some embodiments, the rules data store may store rule parameters, in conjunction with or exclusive of complete rules. In these embodiments, the rule evaluation management component 102 may be configured to create completed rules based on such rule parameters. These unique rule identifiers may be utilized in creation of a reduced evaluated rule data set (e.g., a results data set). One example of a rule data set will be described in more detail with respect to FIG. 3B, below.

Based on a created item combination data set and rule data set, the rule evaluation management component 102 may create an empty result data set for storing the results of each evaluated rule. Subsequently, the rule evaluation management component 102 may distribute all or a portion of the item combination data set, the rule data set, and the empty reduced evaluated rule data set to one or more rule evaluation components 112A-N. Though displayed as four rule evaluation components, the set of rule evaluation components 112A-N may represent any number of rule evaluation components 112. Each rule evaluation component 112 may be operable to evaluate an item combination against a rule, and to determine a result. Each result may be stored in the empty reduced evaluated rule data set, until all results are determined (i.e., the reduced evaluated rule data set is complete).

In some embodiments, a rule evaluation component 114 may utilize item information within the item information data store 114 in order to determine whether an item combination of the previously determined item combination data set satisfies a rule of the previously determined rule data set. For example, a rule evaluation component 114 may retrieve item attributes for each item in a given item combination from the item information data store 114. Illustratively, an evaluated rule data set may be required for a future machine learning application that determines similarities between shoes offered for sale. A given item combination and rule may ask whether the shoe size and width advertised for shoe A is within 85% of the shoe size and width advertised for shoe B. As such, the rule evaluation component 112 may interact with the item information data store 114 in order to retrieve the shoe size and width for each of shoe A and shoe B. Thereafter, the result (e.g., true or false) may be stored within a reduced evaluated rule data set, which in turn may be stored in the evaluated rule data store 108.

In some embodiments, the rule evaluation management component 102 may assign each rule evaluation component 112 a portion of all item combination and rule pairs for evaluation. Distribution of item combination and rule pairs may be based on any of a number of load balancing or distribution techniques. Further, distribution of item combination and rule pairs may be based on the processing capabilities of each rule evaluation component (e.g., the available processing power, network bandwidth, persistent or non-persistent memory, etc.). In some embodiments, distribution of item combination and rule pairs may further be based on the computation needed to evaluate the pair. For example, the evaluation of a given item combination and rule pair may require execution of a complex graphical processing algorithm. In these embodiments, the rule evaluation management component 102 may distribute such item combination and rule pairs to computing devices configured to handle such graphical processing algorithms (e.g., computing devices with high power graphical processing units, high memory, etc.). As a further example, a given item combination and rule pair may require access to a large amount of external data (e.g., attributes of items). In these instances, the rule evaluation management component 102 may distribute such pairs to computing devices with quick access to the required information (e.g., with more network bandwidth, lower latency, etc.).

Further, the rule evaluation management component 102 may maintain a listing of the item combination and rule pairs that have been completed or have yet to be completed. In some embodiments, the rule evaluation management component 102 may utilize a data set identifying the status of each item combination and rule pair (e.g., in order to determine whether the pair has been evaluated). One such rule evaluation status data set will be described in more detail with respect to FIG. 3C, below. After each item combination has been evaluated against each rule, the completed reduced evaluated rule data set (i.e., the results data set) may be stored in the evaluated rule data store 108 for use in future machine learning applications.

The item identifier data store 104, rule data store 106, evaluated rule data store 108, and the item information data store 114 may each correspond to any data store capable of or configured to store information regarding item identifiers, rules, evaluated rules, and item information, respectively. For example, a data store could correspond to any persistent or non-persistent memory storage component such as a hard disk drive (HDD) (including solid state drives), random access memory, tape storage, network accessible storage (NAS). Further, each data store 104 may be local to the rule evaluation management component 102 or a rule evaluation component 112 (e.g., internal to the or directly connected to the component) or remote from all components (e.g., external to each component, connected via a network or other remote connection technology, etc.).

Further, the rule evaluation management component 102 and each rule evaluation component 112 may be a physical or virtual computing component of a variety of configurations. For example, each may correspond to a server or personal computing component, and each may have various processing powers, memories, bandwidth availabilities, etc. Though described above with reference to multiple computing components and data stores, in some embodiments, each of the components of the rule evaluation environment 100 may be implemented by a single computing component. For example, in some embodiments, the rule evaluation management component 102 may itself implement one or more instances of a rule evaluation component 112. Though multiple rule evaluation components 112 are described above, a single rule evaluation component may be used while remaining within the scope of the current disclosure.

Referring to FIG. 2A, one illustrative graphical visualization or representation of an unreduced evaluated rule data set 200 is shown. In this illustrative representation, the unreduced evaluated rule data set 200 is represented as a two-dimensional matrix or array. However, one skilled in the art will appreciated that an unreduced evaluated rule data 200 may be contained within any suitable data type or storage, such as a one dimensional array, a multi-dimensional array, a container data type (e.g., a class, a struct, etc.), a flat file, a database, or any other suitable data type or storage.

As shown in FIG. 2A, an illustrative unreduced evaluated rule data 200 contains a collection of item combinations, rules, and results. As such, the unreduced evaluated rule data 200 may be utilized, for example, by a machine learning application in order to determine algorithms or combinations of rules which best identify duplicate items for sale on an e-commerce site. Illustratively, each column of the unreduced evaluated rule data 200 represents a different type of information, as shown by identifiers 202-212. For example, the first column of the unreduced evaluated rule data 200 represents a first item ID, as shown by the identifier "Item ID A" 202. Each additional column represents a second item ID ("Item ID B") 204, an attribute of the first item to be compared ("Source Attributes") 206, an attribute of the second item to be compared ("Target Attributes") 208, a threshold value for successful comparison ("Threshold") 210, and a result of applying the rule to the item combination ("Result") 212. Though illustrative examples of rule parameters are displayed herein, one skilled in the art will appreciate that any number of rule parameters may exist within a given rule. For example, a rule may specify a certain algorithm for use in the comparison (e.g., an algorithm which ignores whitespace or capitalizations, an algorithm which requires an exact match of data, etc.), whether the match must be symmetrical (e.g., whether the ordering of the item combination is relevant), whether blank attributes are acceptable for satisfaction of a rule, whether additional parameters may be used in processing a rule, and the like.

As such, each row of the unreduced evaluated rule data 200 represents a combination of items, rules, and results. Within the simplified example of FIG. 2, it is assumed that the attributes of each item are compared for a determination of how close the attributes are to exactly matching. If the respective attributes of each item are enough of a match to satisfy the threshold specified in the "threshold" column 210, the item combination and rule pair results in a positive evaluation result (e.g. the item combination satisfies the rule). Otherwise, the result is negative. With reference to FIG. 2, by way of example, row 214 represents the combination of item ID "1," item ID "2" evaluated based on "shoe_size and shoe_width" attribute of item ID 1 and "size_attributes_1" attribute of item ID 2, with an 80% threshold for a positive success. The result of "1" in the result column 200 indicates that these attributes of item ID 1 and item ID 2 do in fact match to at least an 80% threshold. Similarly, row 216 compares the same item combination as row 214; however, the rule now requires at least a 90% match. The result of "1" in the result column 200 of row 216 indicates that these attributes of item ID 1 and item ID 2 do match to at least a 90% threshold. Moreover, row 218 compares the same item combination as rows 214 and 216; however, the rule now requires at least a 95% match. The result of "1" in the result column 200 of row 218 indicates that these attributes of item ID 1 and item ID 2 do not match to at least a 95% threshold.

As a further example, the rows 214 and 220 of the unreduced evaluated rule data 200 share an identical rule (e.g., the same source and target attributes, and the same threshold). However, the item combination of row 214 is item ID 1 and item ID 2, while the item combination of row 220 is item ID 1 and item ID 3. The unreduced evaluated rule data 200 continues, with each row representing a new item combination and rule pair, and the result of each evaluation.

However, it may be noted that only 3 unique item combinations (1 & 2, 1 & 3, and 2 & 3) exist within the unreduced evaluated rule data 200. Further, only 3 unique rule combinations exist (e.g., differing in thresholds as 80%, 90%, and 95%). Because the unreduced evaluated rule data 200 contains 9 lines of data, each item combination and rule is repeated three times, leading to unnecessarily large memory requirements when storing the unreduced evaluated rule data 200. For example, assuming the very simplified example in which each item ID (e.g., columns 202-204) and each rule component (e.g., columns 206-210) may be represented in 1 byte, and in which each result may be represented in 1 bit (e.g., true or false), each row of the unreduced evaluated rule data 200 would require 5 bytes and 1 bit to represent (e.g., 41 bits, if 8 bytes=1 bit). Because the unreduced evaluated rule data 200 has 9 rows (3 item combinations*3 rules), a total of over 46 bytes (369 bits) would be needed to store the unreduced evaluated rule data 200.

Figure 3A:
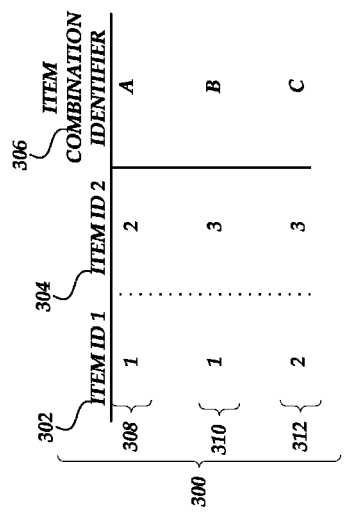
FIGS. 3A and 3B are illustrative graphical visualizations or representations of an item identifier data set and a rule data set, respectively, which may be used in conjunction with a reduced evaluated rule data set.
Figure 3B:
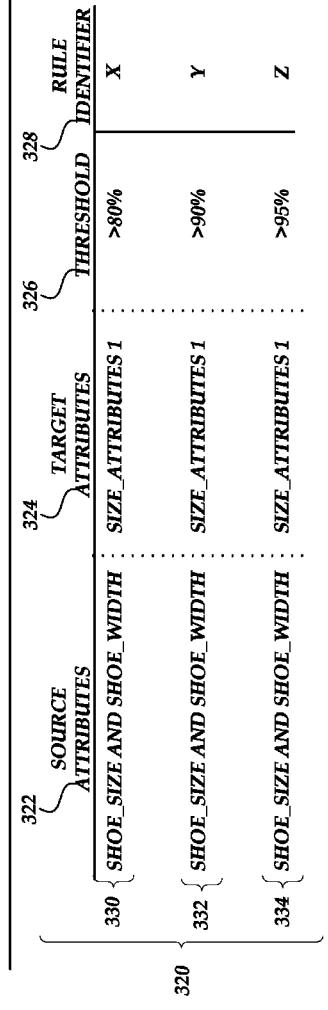
Figure 3C:
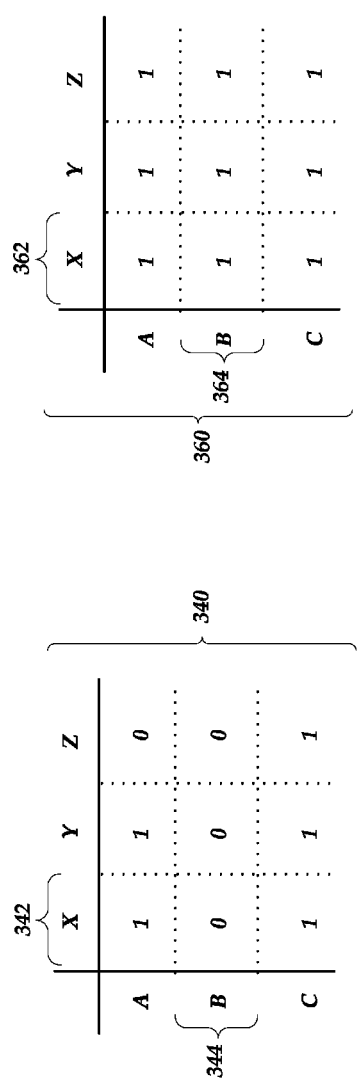
FIG. 3C is an illustrative graphical visualization or representations of a reduced evaluated rule data set, which may be used in conjunction with the item identifier data set and a rule data set of FIGS. 3A and 3B.

Referring to FIGS. 3A-3C, illustrative graphical visualization or representation of an item combination data set, a rule data set, and examples of reduced evaluated rule data sets (e.g., results sets) are shown. In conjunction, these data sets may be used to represent the results and information of the unreduced evaluated rule data set of FIG. 2, discussed above. However, the memory required to store these data sets may be reduced. In addition, because the item combination data set and the rule data set might not change during rule evaluation, these data sets may only need to be transmitted once, further reducing bandwidth consumption, and enabling distributed rule evaluation.

With reference to FIG. 3A, an illustrative visualization or representation of an item combination data set 300 is shown. This item combination data set 300 may be produced, for example, by the rule evaluation management component 102 of FIG. 1. Further, though the simplified the item combination data set 300 contains only three item combinations, any number of item combinations may be represented within an item combination data set. For example, an item combination data set may represent all possible combinations of the item identifiers contained within the item identifier data store 104. In the illustrative example of FIG. 3A, the item combination data set 300 contains identifiers for a combination of two items. As such, three columns are contained within the item combination data set 300: a first column 302 corresponding to a first item identifier, a second column 304 corresponding to a second item identifier, and a third column 306 corresponding to an item combination identifier. However, in other embodiments, combinations of any number of items may be included, and additional columns added for each combined item. For example, combinations of three items may be represented by four columns; combinations of four items may be represented by five columns, etc.

Each item combination identifier may be any value which can be uniquely mapped to combination of items in the item combination data set 300. For example, item combination identifier 306 of row 308 corresponds to "A," which uniquely identifies the combination of item ID 1 and item ID 2. Similarly, item combination identifier 306 of row 310 corresponds to "B," which uniquely identifies the combination of item ID 1 and item ID 3. Lastly, item combination identifier 306 of row 312 corresponds to "C," which uniquely identifies the combination of item ID 2 and item ID 3. Each item combination corresponds to one of the possible item combinations discussed above with reference to FIG. 2. Following the simplified example given above with respect to FIG. 2, and assuming an item combination identifier can be given in 2 bytes (e.g., if there are less than 65,536 item combinations), each row of the item combination data set may be represented in 4 bytes (1 byte per item identifier, 2 per item combination identifier). Therefore, the item combination data set 300 may be represented in 12 bytes of data.

With reference to FIG. 3B, an illustrative visualization or representation of a rule data set 320 is shown. This rule data set 320 may be produced, for example, by the rule evaluation management component 102 of FIG. 1. Further, though the simplified the rule data set 320 contains only three rules, a rule data set may represent any number of rules contained within the rules data store 106. In some embodiments, the rule data set may represent every possible combination of every rule component (e.g., matching algorithm, attributes to be matched, accepted blanks, thresholds, etc.) contained within the rules data store 106. Illustratively, the rule data set 320 contains identifiers for a combination multiple rule components. Columns 322-326 are included, each reflecting a given component of a rule: a first column 322 corresponding to source attribute, a second column 324 corresponding to a target attribute, and a third column 326 corresponding to a threshold for a successful result. In other embodiments, a number of rule components may be included, and additional columns added for each additional rule component.

Each rule identifier may be any value which can be uniquely mapped to rule in the rule data set 320. For example, rule identifier 328 of row 330 corresponds to "X," which uniquely identifies the comparison of "shoe_size and shoe_width" of a first item with "size_attributes 1" of a second item at a threshold of 80 percent. Similarly, rule identifier 328 of row 332 corresponds to "Y," which uniquely identifies the comparison of "shoe_size and shoe_width" of a first item with "size_attributes 1" of a second item at a threshold of 90 percent. Lastly, rule identifier 328 of row 330 corresponds to "Z," which uniquely identifies the comparison of "shoe_size and shoe_width" of a first item with "size_attributes 1" of a second item at a threshold of 95 percent. Each rule corresponds to one of the possible rules discussed above with reference to FIG. 2. Following the simplified example given above with respect to FIG. 2, and assuming a rule identifier can be given in 3 bytes (e.g., if there are less than ~16 million rules), each row of the rule data set may be represented in 6 bytes (1 byte per rule component, 3 per rule identifier). Therefore, the rule data set 320 may be represented in 18 bytes of data.

With reference to FIG. 3C, an illustrative visualization or representation of a reduced evaluated rule data set 340 (i.e., the results data set) is shown, as well as a rule evaluation status data set 360. The results data set 340 may be produced, for example, by the rule evaluation management component 102 in conjunction with one or more rule evaluation components 112 of FIG. 1, as will be described in more detail below. The reduced evaluated rule data set 340, in conjunction with the item combination data set 300 of FIG. 3A and the rule data set 320 of FIG. 3B, may be utilized in order to represent the same information as the unreduced evaluated rule data set 200 of FIG. 2. The reduced evaluated data set 200 is shown for illustrative purposes as a two dimensional array. However, the reduced evaluated data set 200, or any other data set discussed herein, may be alternatively represented as a one dimensional array or any other suitable data type or data structure. For example, a specialized one dimensional array may result in a low overhead data storage cost for representing the reduced evaluated data set 200.

Each row index of the reduced evaluated data set 200 may correspond to a unique item combination identifier 306 of FIG. 3A. For example, the row 344 may correspond to the item combination identifier "B," associated with row 310 of FIG. 3A, which represents item ID 1 and item ID 3. Each column index of the reduced evaluated data set 200 may correspond to a unique rule identifier 328 of FIG. 3B. For example, the row 342 may correspond to the rule identifier "X," associated with row 330 of FIG. 3B, which represents the rule comparing the "shoe_size and shoe_width" attributes of a first item against a "size_attributes 1" attribute of a second item, at an 80% threshold for success. When the bit stored at each column and row is identified, the result of the item combination and rule pair may be determined. For example, the number at the intersection of row 344 and column 342 is "0," indicating that item ID 1 and item ID 3 do not satisfy the aforementioned rule. Similarly, each row and column pair represents one of the results of the unreduced data set 200 of FIG. 2.

Because only single bits of information are used for each row and column pair within the reduced evaluated data set 200, the memory requirements for storing the reduced evaluated data set 200 are greatly reduced. For example, the illustrative, simplified reduced evaluated data set 200 could be theoretically represented in fewer than 2 bytes (9 bits). When used in conjunction with the item comparison data set 300 of FIG. 3A (12 bytes, as discussed above) and the rule data set 320 of FIG. 3B (18 bytes, discussed above), all three simplified data sets could theoretically be stored in under 32 bytes (or about 242 bits), a significant reduction of the 46 bytes necessary to store the unreduced evaluated rule data set of FIG. 2. Further, as the number of rules and item comparisons increases, it is expected that the memory savings of the reduced evaluated rule data set 344 would increase.

FIG. 3C further includes a rule evaluation status data set 360, which may optionally be used during generation of the reduced evaluated data set 340 (e.g., when the reduced evaluated data set 340 is distributively computed). However, because the rule evaluation data set 360 does not strictly contain information necessary to convey the result of an evaluated rule, in some embodiments, the rule evaluation status data set 360 may be unnecessary, and therefore omitted. Generally, the rule evaluation status data set 360 may represent whether each of the item combination and rule pairs has been evaluated and stored as a result in the reduced evaluated rule data set 340. As such, the rule evaluation status data set 360 may represent the same column and row configuration as the reduced evaluated rule data set 340. By referencing the same column and row pair within the rule evaluation status data set 360 as a given result within the reduced evaluated rule data set 340, a determination can be made as to whether the result is valid (e.g., the item combination and rule have actually been evaluated). For example, row 364 of the rule evaluation status data set 360 represents the item combination identifier "B," while column 362 represents the rule identifier "X." The data which exists in the rule evaluation status data set 360 at row 364 and column 362 is a 1, or positive bit. Therefore, the item combination identifier B has been evaluated with the rule identifier X. Illustratively, at the creation of an empty, unevaluated reduced evaluated data set 340 (e.g., before any evaluation), each data item within the rule evaluation status data set 360 may be set to zero. Thereafter, as each item combination and rule pair is evaluated, the corresponding result may be recorded into the reduced evaluated data set, and the rule evaluation status data set 360 may be modified to record that the item combination and rule pair have been evaluated. As such, the status of a rule evaluation process may be monitored, even during distributed processing.

Though described above with respect to two different arrays, one skilled in the art will appreciate that the reduced evaluated data set 340 and the rule evaluation status data set 360 may be represented by a single array. For example, each row and column combination could hold a two bit identifier, with at least three states (null or unevaluated, true, and false). As such, though described above for illustrative purposes, the information within the rule evaluation status data set 360 may be represented in a variety of data configurations.

Figure 4:
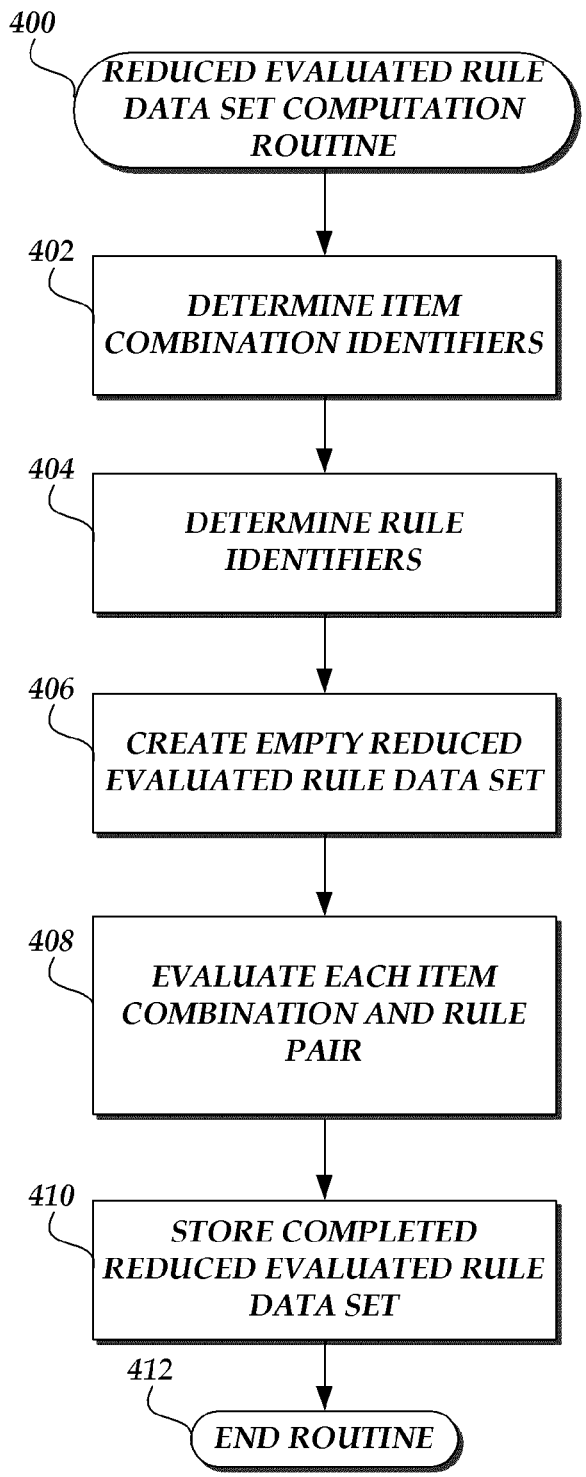
FIG. 4 is a flow diagram of an illustrative reduced evaluated rule data set computation routine for generating, e.g., the item identifier data set and a rule data set of FIGS. 3A and 3B, and the reduced evaluated rule data set of FIG. 3C.

With reference to FIG. 4, an illustrative routine 400 is displayed for the computation of a reduced evaluated data set. Illustratively, the routine 400 may be carried out by the rule evaluation management component 102 in conjunction with one or more rule evaluation components 112 of FIG. 1. As described above, in some embodiments, a single machine may implement both the rule evaluation management component 102 and one or more rule evaluation components 112. As such, in some embodiments, the routine 400 may be carried out by a single component.

At block 402, the rule evaluation management component 102 may determine a set of item combination identifiers (e.g., for inclusion in an item combination data set 300 of FIG. 3A). Determination of the set of item combination identifiers may, for example, include retrieving a set of item identifiers from an item identifier data store 104 or item information data store 114 of FIG. 1. In some embodiments, a number of items or item combinations may be manually specified (e.g., by an operator of the rule evaluation environment 100). Where individual item identifiers are retrieved, the rule evaluation management component 102 may determine each possible or desired combination of item identifiers. For example, where three item identifiers exist, and combinations of two item identifiers are desired, the total possible combinations would be 3 (1 & 2, 2 & 3, 1 & 3). In some embodiments, the order of item combinations may have an effect on the overall rule evaluation. As such, in these embodiments, the rule evaluation management component 102 may be configured to determine each possible order of each possible combination (i.e., all permutations).

Each determined item combination may then be assigned an identifier that uniquely identifiers each item ID within the item combination. For example, the combination of item ID 1 and item ID 2 may be assigned the unique identifier 'A.' In some embodiments, these identifiers may be determined based at least in part on the indexing schema required within a reduced evaluated rule data set. For example, each item combination identifier may correspond to a local row or column assignment within a potential reduced evaluated rule data set. The item combinations and item combination identifiers may be stored within an item combination data set, such as the item combination data set 300 of FIG. 3A.

In some embodiments, the item combination data set 300 may be further compressed or altered in order to facilitate lower memory requirements. For example, the item combination data set 300 may be processed via a hashing algorithm to create a hashed item combination data set. Hashing algorithms are generally known within the art, and therefore will not be discussed at greater length herein.

At block 404, the rule evaluation management component 102 may determine a set of rule identifiers (e.g., for inclusion in a rule data set 320 of FIG. 3B). Determination of the set of rule identifiers may, for example, include retrieving a set of rules or rule components from a rules data store 106 of FIG. 1. In some embodiments, a number of rules may be manually specified (e.g., by an operator of the rule evaluation environment 100). Where individual rule components are retrieved, the rule evaluation management component 102 may determine each possible or desired combination of rule components. In some embodiments, the order of rules may have an effect on the overall rule evaluation. As such, in these embodiments, the rule evaluation management component 102 may be configured to determine each possible order of each possible rule component combinations (i.e., all permutations).

Each determined rule may then be assigned an identifier that uniquely identifiers the completed rule. For example, a rule evaluated a "shoe_size and shoe_width attribute" against a "size_attributes 1" attribute, at a threshold of 80%, may be assigned the unique identifier 'X.' In some embodiments, these identifiers may be determined based at least in part on the indexing schema required within a reduced evaluated rule data set. For example, each rule identifier may correspond to a row or column assignment within a potential reduced evaluated rule data set. The rules and rule identifiers may be stored within an rule data set, such as the rule data set 320 of FIG. 3B.

In some embodiments, the rule data set 300 may be further compressed or altered in order to facilitate lower memory requirements. For example, the rule data set 320 may be processed via a hashing algorithm to create a hashed rule data set. Hashing algorithms are generally known within the art, and therefore will not be discussed at greater length herein.

At block 406, an empty reduced evaluated rule data set may be created. Illustratively, an empty reduced evaluated rule data set may correspond to the reduced evaluated rule data set 340 of FIG. 3C, where the result of each evaluated rule is understood to not yet be determined. For example, the reduced evaluated rule data set 340 may be created in conjunction with a rule evaluation status data set 360 of FIG. 3C, where each value within the rule evaluation status data set 360 is set to false (e.g., all item combination and rule pairs are not yet evaluated). Illustratively, the size of the empty reduced evaluated rule data set may be determined by the number of determined item combination identifiers multiplied by the number of determined rule identifiers. For example, three item combination identifiers and three rule identifiers would result in a nine block reduced evaluated rule data set. In some embodiments, each row and column of the empty reduced evaluated rule data set may correspond to an item combination identifier and a rule identifier, respectively (or vice versa). By utilizing the item combination identifiers and rule identifiers as indexes within the reduced evaluated rule data set, the need to positively store item combination identifiers and rule identifiers in the reduced evaluated rule data set may be reduced or eliminated.

In some embodiments, the evaluated rule data set may be created during evaluation of rules. For example, the reduced evaluated rule data set may be created as each result is calculated. In these embodiments, creation of an empty reduced evaluated rule data set may be unnecessary. Therefore, in these embodiments, block 406 may be omitted.

At block 408, each item combination and rule pair may be evaluated to determine a result. Illustratively, this may include analyzing attributes of each item combination based on the rule components associated with each rule. For example, an item combination and rule pair may correspond to item combination "A" evaluated against rule "X." Referring to the determined item combination identifiers and rule identifiers discussed above, this may correspond with evaluating item ID 1 and 2 based on a comparison of "shoe_size and shoe_width" of item ID 1 versus the "size_attributes__1" of item ID 2, at a 80% threshold for a successful comparison. In some embodiments, evaluation of a rule may include retrieving data from the item information data store 114 of FIG. 1. As each item combination and rule pair is evaluated, the results may be stored within a reduced evaluated rule data set, such as the previously created empty reduced evaluated rule data set. Further, a rule evaluation status data set may be modified to reflect that a given item combination and rule pair has been evaluated. In some embodiments, evaluation of each item combination identifier and rule pair may be distributed among a number of rule evaluation components 112 of FIG. 1, as will be discussed in more detail below with respect to FIG. 6.

At block 410, after each item combination and rule pair has been evaluated, a completed reduced evaluated data set may be stored for future use (e.g., in the evaluated rule data store 108 of FIG. 1). As described above, the evaluated rule data set may be utilized, for example, in machine learning applications. Illustratively, comparisons of pairs of items against a variety of rules may be used to determine or evolve an algorithm for detecting duplicate items for sale on an e-commerce system.

Further, use of the reduced evaluated rule data set may facilitate faster processing of a machine learning application. For example, the memory requirements of an unreduced evaluated rule data set may be such that storage of the unreduced evaluated rule data set may not be possible within fast access memory (e.g., RAM). Therefore, machine learning utilizing the unreduced evaluated rule data set may require storing the unreduced evaluated rule data set in slower access memory (e.g., a HDD). Further, bandwidth requirements for distribution of an unreduced evaluated rule data set may make distributed calculation of the evaluated rule data set untenable. In contrast, the reduced memory consumption of the reduced evaluated rule data set may allow the entirety of the reduced evaluated rule data set to be help in faster access memory of a processing computing component (e.g., RAM), therefore speeding up machine learning applications. In addition, the reduced memory consumption of the reduced evaluated rule data set may facilitate distributed evaluation of the data set. Moreover, as described above, use of a reduced evaluated rule data set may enable easy addition of new item combinations and rules without decompression, recomputation, or recompression of any data set. For example, new rules or item combinations could be appended at the end of either an item combination data set or a rule data set, respectively. Similarly, the reduced evaluated rule data set could simply be expanded to include results of new evaluations based on the item combinations or rules, without needing to recreate the data previously held within the data set.

As described above, in some embodiments, an item combination data set 300 or rule data set 320 may be further anonymized or obfuscated (e.g., in order to protect sensitive information). For example, the item combination data set 300 may include personal information of a number of users of an e-commerce site or social networking system. Each item combination may therefore be modified in order to remove, obscure, or anonymize such sensitive information. In some embodiments, the rule data set 320 may also be altered, anonymized, or obscured (e.g., when it contains private algorithms or other sensitive information). As such, the reduced evaluated data set 340, in conjunction with the anonymized item combination data set 300 and rule data set 320, may be distributed without revealing such sensitive information.

Figure 5:
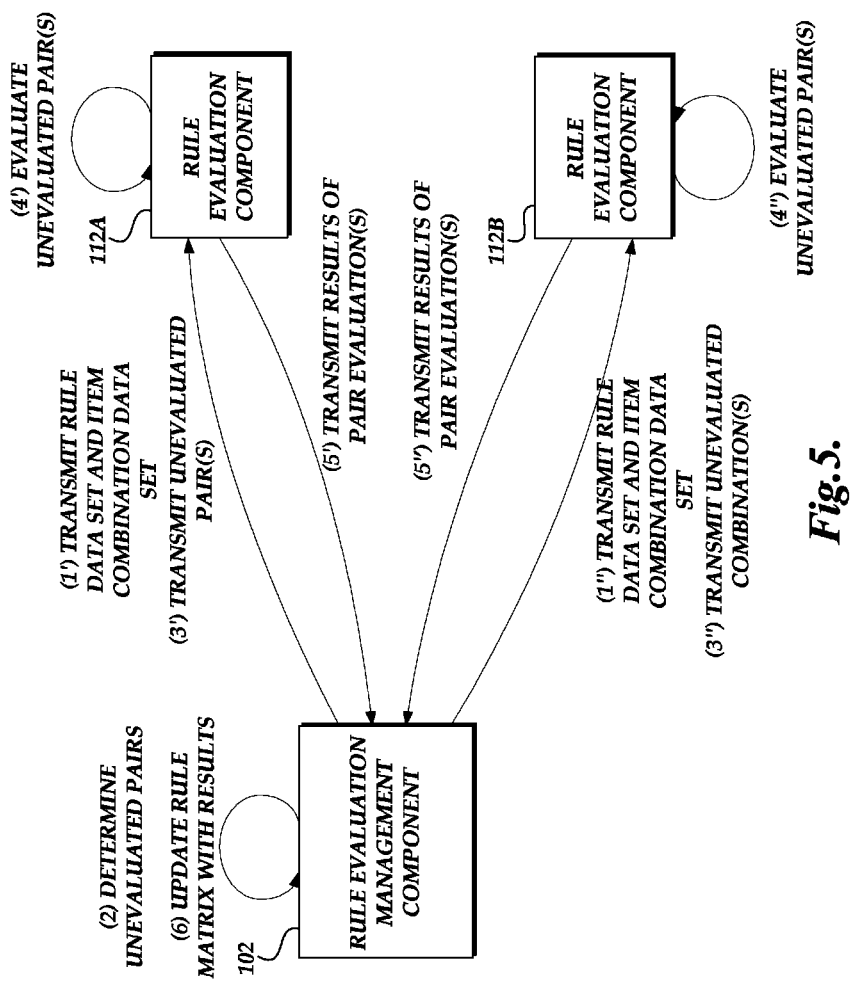
FIG. 5 depicts an illustrative interaction between a rule evaluation management component and a number of rule evaluation components of FIG. 1 to distributively create a reduced evaluated rule data set.

With reference to FIG. 5, a block diagram of an illustrative interaction between the rule evaluation management component 102 and a number of rule evaluation components 112 of FIG. 1 is displayed. Specifically, the illustrative interaction of FIG. 5 may correspond to the distributive evaluation of a number of item combination and rule pairs. Though FIG. 5 is illustrated as including two rule evaluation components 112A and 112B, one skilled in the art will appreciate that the interaction may include any number of rule evaluation components 112. Further, the rule evaluation components may include components of various configurations, such as processing power, bandwidth, etc.

Some of the illustrative interactions of FIG. 5 may be denoted by primes (e.g., 1', 1"). While these interactions will be discussed as a single interaction (denoted by their corresponding number), one skilled in the art will appreciate that these interactions are not required to happen at the same time. For example, the interaction labeled 1' may occur before, after, or simultaneously with 1".

At (1), a previously created rule data set and item combination data set may be transmitted to each rule evaluation component 112 (e.g., rule evaluation components 112A and 112B). As discussed above, an item combination data set may include a mapping of an item combination identifier to each item ID within the item combination. Further, a rule data set may include a mapping of a rule identifier to a given rule, and specify each rule component of the rule (e.g., a given algorithm, attributes to include, whether symmetry is required, a threshold, etc.).

At (2), the rule evaluation management component may determine a number of unevaluated item combination and rule pairs. Such a determination may be made, for example, in conjunction with a rule evaluation status data set, such as the rule evaluation status data set 360 of FIG. 3C. In some embodiments, determination of a number of unevaluated item combination and rule pairs may include determining a rule evaluation component 112A to assign to each item combination and rule pair. For example, the rule evaluation management component 102 may determine that the rule evaluation component 112A should receive 5 item combination and rule pairs for evaluation, while the rule evaluation component 112B should only receive 2. Such a determination may be made in conjunction with a variety of load balancing and distributive processing techniques well known within the art. Further, in some embodiments, the rule evaluation management component 102 may not assign all unevaluated time combination and rule pairs to a given rule evaluation component 112 at a given instance. For example, the rule evaluation management component 102 may assign rule evaluation components 112 to half of the unevaluated item combination and rule pairs, and continue to assign additional item combination and rule pairs as results are received.

Thereafter, at (3), a set of unevaluated item combination and rule pairs may be transmitted to the rule evaluation components 112A and 112B. Each rule evaluation component 112 may then utilize the previously transmitted item combination data set and rule data set to determine which items to evaluate and under which rule. For example, an item combination and rule pair of "item combination 'A' and rule 'X'" would correspond to evaluating item ID 1 and 2 based on a comparison of "shoe_size and shoe_width" of item ID 1 versus the "size_attributes_1" of item ID 2, at a 80% threshold for a successful comparison.

As such, at (4), each rule evaluation component 112 may evaluated their assigned item combination and rule pairs to determine a result of the evaluation. In some embodiments, evaluation of an item combination and rule pair may require communication with a data store, such as the item information data source 114 of FIG. 1. For example, when evaluating the "shoe_size and shoe_width" of item ID 1 versus the "size_attributes_1" of item ID 2, each of these attribute values may need to be retrieved from the item information data source 114 prior to evaluation. Generally, each result of evaluation may be one of a set number of values (e.g., true or false). At (5), these results may be transmitted back to the rule evaluation management component 102.

Thereafter, at (6), the rule evaluation management component 102 may update a reduced evaluated rule data set with the results of each evaluation. In some embodiments, a complete or partially complete reduced evaluated rule data set may be stored, as described in more detail above, with respect to FIG. 4. As such, the reduced evaluated data set may be made available to computing components for use in, e.g., machine learning applications.

Figure 6:
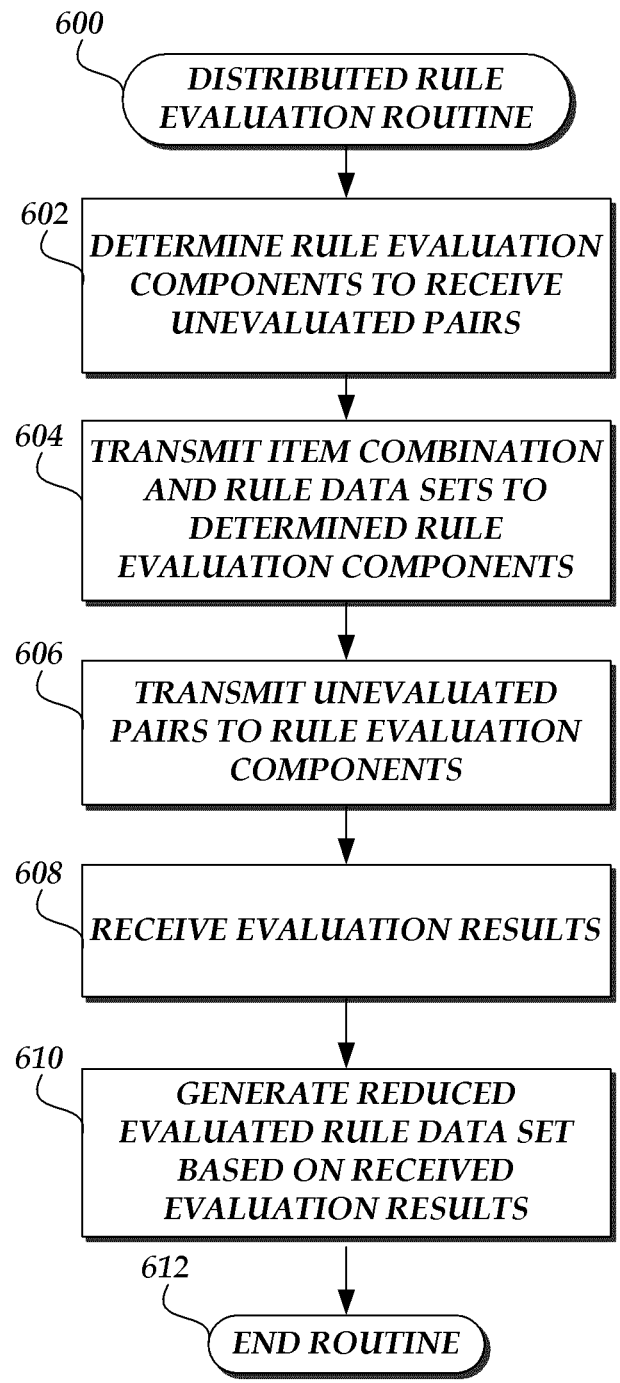
FIG. 6 is a flow diagram of a distributed rule evaluation routine for distributively computing the reduced evaluated rule data set of FIG. 3C.

With reference to FIG. 6, an illustrative routine 600 is displayed for the distributed evaluation of item combination and rule pairs. Illustratively, the routine 600 may be carried out by the rule evaluation management component 102 in conjunction with one or more rule evaluation components 112 of FIG. 5. For example, the illustrative routine 600 may correspond to subroutine corresponding to block 408 of FIG. 4. Further, the illustrative routine 600 may correspond to a routine implemented by the rule evaluation management component 102 during the illustrative interaction of FIG. 5.

At block 602, a number of rule evaluation components to assist in the distributive evaluation of rules may be determined. These rule evaluation components may correspond, for example, to rule evaluation components 112 of FIG. 5. The determination of rule evaluation components may be based, for example, on the configuration or status of rule evaluation components (e.g., total power or availability of central processing units (CPUs), memory, bandwidth, etc.), on the number or type of item combination and rule pairs to be evaluated, or on other requirements (e.g., service level agreements, the priority of a corresponding machine learning application, etc.). In some embodiments, a combination of or criteria may be used to select a set of rule evaluation components. For example, the type of item combination and rule pair to be evaluated may be computational intense with respect to a specific type of computation. Illustratively, two items offered for sale on an e-commerce site may be compared based on images of the items provided on the site. Illustratively, image comparison may be used to determine whether the items are the same items or similar items. Comparison of item images may be computationally difficult when executed by a generic computing component, but relatively less difficult (or more quickly completed) when executed by a specifically configured computing component (such as one with specialized graphical processing algorithms or with specialized graphical processing hardware). As such, these item combinations and rule pairs may be distributed to such specifically configured computing component. Other item combination and rule pairs which do not require intensive graphical comparison may be distributed to computing component without the above-discussed specific configuration. As such, in these embodiments, a combination of the requirements of the item combination and rule pair as well as the configuration of an evaluation component may be utilized in order to determine rule evaluation components to receive unevaluated pairs.

Still further, in some embodiments, a number of rule evaluation components may be predetermined (e.g., manually specified). In some embodiments, block 602 may further include a determination of which item combination and rule evaluation pairs to transmit to each rule evaluation component (e.g., based on any of the criteria described above, or based on further criteria).

At block 604, a previously created rule data set and item combination data set may be transmitted to each determined rule evaluation component. As discussed above, an item combination data set may include a mapping of an item combination identifier to each item ID within the item combination. Further, a rule data set may include a mapping of a rule identifier to a given rule, and specify each rule component of the rule (e.g., a given algorithm, attributes to include, whether symmetry is required, a threshold, etc.). These data sets may be created, for instances, during execution of the routine 400 of FIG. 4, discussed above.

At block 606, a set of unevaluated item combination and rule pairs may be transmitted to the determined rule evaluation components. As noted above, in some embodiments, the routine 400 may include a determination of which item combination and rule evaluation pairs to transmit to each rule evaluation component. In these embodiments, transmission of the unevaluated item combination and rule pairs may correspond to transmission of the previously determined item combination and rule evaluation pairs. In other embodiments, item combination and rule evaluation pairs may be distributed according to a number of techniques known in the art (e.g., round robin distribution, random distribution, equal distribution, etc.).

At block 608, results of the evaluation of the previously transmitted item combination and rule pairs may be received from the previously determined rule evaluation components. Illustratively, such results may be generated by a rule evaluation component similarly to as described above with respect to FIG. 5.

Thereafter, at block 610, the rule evaluation management component 102 may generate a reduced evaluated data set based on the received results, as described in more detail above. The reduced evaluated data set may correspond, for example to the reduced evaluated data set 340 of FIG. 3C.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for distributive creation of a reduced evaluated rule data set, the computer-implemented method comprising:

determining a set of item combination identifiers, wherein each item combination identifier corresponds to a combination of items to be evaluated against a set of rules for creation of a reduced evaluated rule data set;

determining a set of rule identifiers, wherein each rule identifier corresponds to a rule used in evaluating items for creation of the reduced evaluated rule data set, and wherein each rule comprises a set of rule components;

for each pair of (1) an item combination identifier from the set of item combination identifiers and (2) a rule identifier from the set of rule identifiers:

transmitting the pair of item combination identifier and rule identifier to at least one rule evaluation computing component of a set of rule evaluation computing components;

receiving a result of an evaluation based at least in part on the item combination identifier and the rule identifier;

aggregating the received results to create a reduced evaluated rule data set, wherein each result within the reduced evaluated rule data set is indexed according to a corresponding pair of item combination identifier and rule identifier; and storing the reduced evaluated rule data set.

2. The method of claim 1, wherein storing the reduced evaluated rule data set comprises causing the storage of the reduced evaluated rule data set in random access memory (RAM) of a computing device.

3. The method of claim 1, wherein each rule evaluation computing component of the set of rule evaluation computing components is operable to evaluate the item combination identifier within the pair based at least in part on the rule identifier within the pair.

4. The method of claim 1 further comprising creating a hashed item combination identifier data set based at least in part on processing the determined set of item combination identifiers in conjunction with a hashing algorithm.

5. The method of claim 1, wherein determining a set of item combination identifiers comprises:

determining a set of item identifiers; and determining at least one of a set of combinations of each item identifier within the set of item identifiers and a set of permutations of each item identifier within the set of item identifiers.

6. The method of claim 1, wherein each at least one rule evaluation computing component is determined according to at least one of the configuration of the at least one rule evaluation computing component or the pair of an item combination identifier and a rule identifier.

7. The method of claim 6, wherein evaluation of a given pair of an item combination identifier and a rule identifier includes graphical processing, and wherein the given pair of an item combination identifier and a rule identifier is transmitted to a rule evaluation computing component configured for graphical processing.

8. A system for creation of a reduced evaluated rule data set, the system comprising:

one or more computing devices configured to:

determine a set of item combination identifiers, wherein each item combination identifier corresponds to a combination of items to be evaluated against a set of rules;

determine a set of rule identifiers, wherein each rule identifier corresponds to a rule comprising a set of rule components;

for each pair of (1) an item combination identifier from the set of item combination identifiers and (2) a rule identifier from the set of rule identifiers, evaluate the combination of items corresponding to the item combination identifier based at least in part on the rule corresponding to the rule identifier;

aggregate each results of each evaluation to create a reduced evaluated rule data set, wherein each result within the reduced evaluated rule data set is indexed according to a corresponding pair of item combination identifier and rule identifier; and cause the storage of the reduced evaluated rule data set.

9. The system of claim 8, wherein the one or more computing devices are configured to evaluate the combination of items corresponding to the item combination identifier at least in part by being configured to:

transmit the pair of item combination identifier and rule identifier to at least one rule evaluation computing component of a set of rule evaluation computing components; and receive a result of an evaluation based at least in part on the item combination identifier and the rule identifier.

10. The system of claim 9, wherein the one or more computing devices are further configured to:

create a evaluated rule status data set; and for each received result, update the evaluated rule status data set to reflect the received result.

11. The system of claim 8, wherein the one or more computing devices are configured to determine a set of rule identifiers based at least in part on a determination of a set of rule components, and wherein each rule component corresponds to a parameter for evaluating a rule.

12. The system of claim 11, wherein a rule component corresponds to at least one of an algorithm, an attribute, a required symmetry, or a threshold.

13. The system of claim 8, wherein the one or more computing devices are configured to create a hashed item combination identifier data set based at least in part on the determined set of item combination identifiers and based at least in part on a hashing algorithm.

14. The system of claim 13, wherein the one or more computing devices are configured to transmit the hashed item combination identifier data set to each of a set of rule evaluation computing components.

15. The system of claim 8, wherein the one or more computing devices are configured to create a hashed rule identifier data set based the determined set rule identifiers and based at least in part on a hashing algorithm.

16. The system of claim 8, wherein the one or more computing devices are configured to determine a set of item combination identifiers based at least in part on a determination of at least one of each combination of item identifiers within the set of item identifiers or each permutation of item identifiers within the set of item identifiers.

17. The system of claim 8, wherein the one or more computing devices are configured to create an anonymized item combination identifier data set based at least in part on the determined set of item combination identifiers.

18. A non-transitory computer readable medium having at least one computer executable component for creation of a reduced evaluated data set, the at least one computer executable component comprising:

an evaluation management component configured to:
- determine a set of item combination identifiers, wherein each item combination identifier corresponds to a combination of items;
- determine a set of condition identifiers, wherein each condition identifier corresponds to a condition;
- for each pair of (1) an item combination identifier from the set of item combination identifiers and (2) a condition identifier from the set of condition identifiers, evaluate the combination of items corresponding to the item combination identifier based at least in part on the condition corresponding to the condition identifier;
- create a reduced evaluated data set comprising a result of each evaluation, wherein each result within the reduced evaluated data set is indexed according to a corresponding pair of item combination identifier and condition identifier; and
- store the reduced evaluated data set.

19. The non-transitory computer readable medium of claim 18 wherein the evaluation management component is configured to evaluate the combination of items corresponding to the item combination identifier based at least in part by being configured to:
- transmit the pair of item combination identifier and condition identifier to at least one condition evaluation computing component of a set of condition evaluation computing components; and
- receive a result of an evaluation based at least in part on the item combination identifier and the condition identifier.

20. The non-transitory computer readable medium of claim 19, wherein the evaluation management component is further configured to:
- create a evaluation status data set; and
- for each received result, update the evaluation status data set to reflect the received result.

21. The non-transitory computer readable medium of claim 18, wherein the evaluation management component is configured to determine a set of condition identifiers based at least in part on a determination of a set of condition components, and wherein each condition component correspond a parameter for inclusion within a condition.

22. The non-transitory computer readable medium of claim 18, wherein the evaluation management component is configured to create a hashed item combination identifier data set based at least in part on the determined set of item combination identifiers and based at least in part on a hashing algorithm.

23. The non-transitory computer readable medium of claim 18, wherein the evaluation management component is configured to transmit the hashed item combination identifier data set to each of a set of condition evaluation computing components.

24. The non-transitory computer readable medium of claim 18, wherein the evaluation management component is configured to determine a set of item combination identifiers based at least in part on a determination of at least one of each combination of item identifiers within the set of item identifiers or each permutation of item identifiers within the set of item identifiers.

25. The non-transitory computer readable medium of claim 18, wherein the evaluation management component is configured to create an anonymized condition identifier data set based at least in part on the determined set of item condition identifiers.

* * * * *